Aug. 28, 1945.   G. P. LEISTENSNIDER ET AL   2,383,604
THERMAL INSULATION AND METHOD OF MANUFACTURE
Filed March 5, 1943
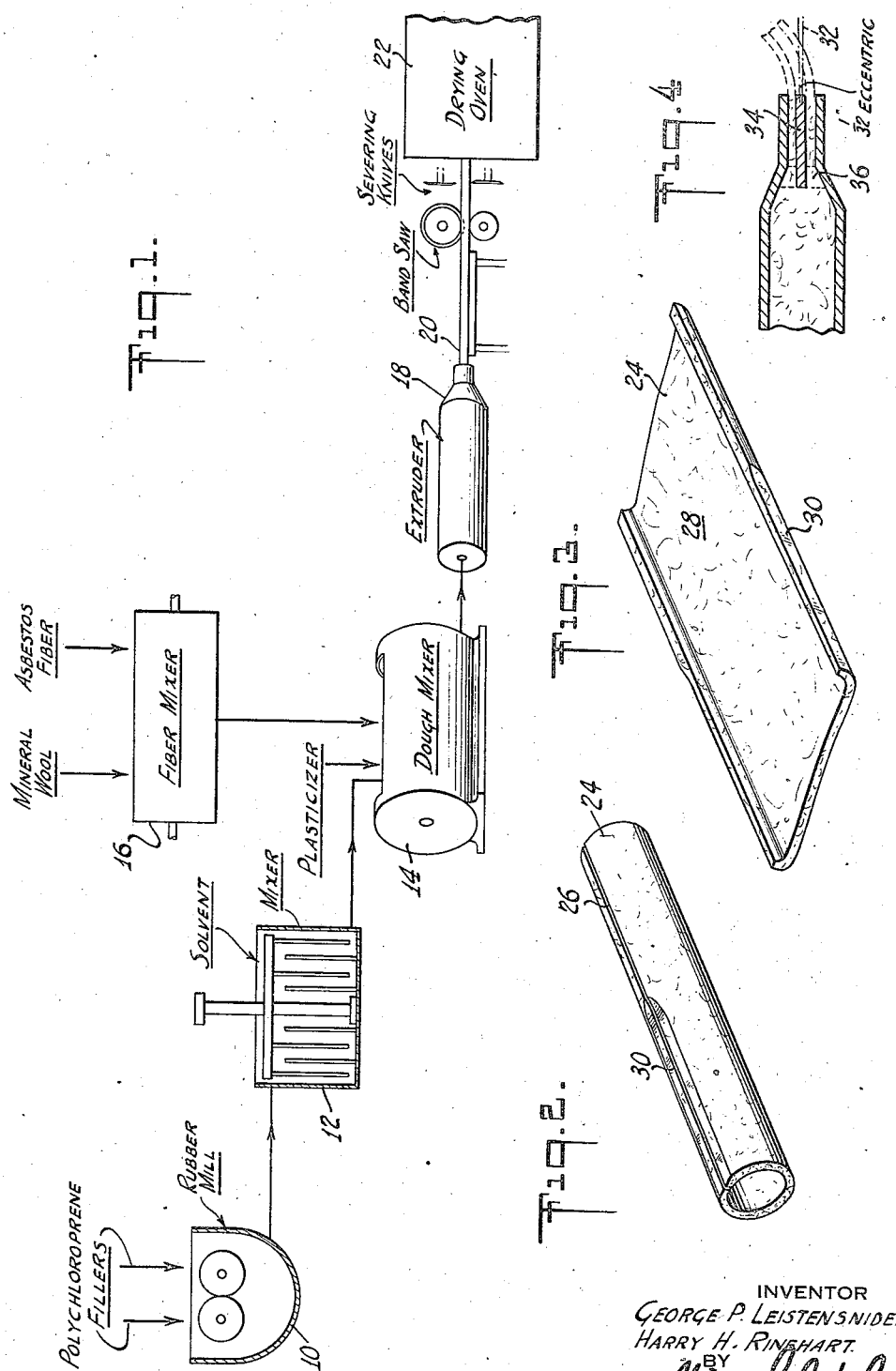
INVENTOR
GEORGE P. LEISTENSNIDER
HARRY H. RINEHART
BY
ATTORNEY Patented Aug. 28, 1945

2,383,604

UNITED STATES PATENT OFFICE 2,383,604

THERMAL INSULATION AND METHOD OF MANUFACTURE

George P. Leistensnider, Somerville, and Harry H. Rinehart, Plainfield, N. J., assignors to Johns-Manville Corporation, New York, N. Y., a corporation of New York Application March 5, 1943, Serial No. 478,156

2 Claims. (Cl. 260—41)

The present invention relates to thermal insulation, and is particularly directed to improved fiber-binder insulation compositions and method of manufacturing same.

A particular object of the invention is to provide thermal insulating compositions and shapes suitable for insulating oil pipes, tubular housings and similar parts for effective cold weather operation. A more particular object is to provide an extrusion shaped thermal insulation element of uniform texture and strong, flexible, air-impervious structure adapted for insulating airplane engine parts to insure efficient operation over a wide range of operating temperatures.

Other objects of the invention are to provide fiber-binder insulating shapes which are sufficiently firm, tough and resilient to resist any abrasive action of sand suspended in air streams impinging thereon, and to absorb repeated vibration and jarring shocks and strains without injury; and which are at the same time non-inflammable and resistant to deterioration by contact with oil, water and gasoline.

Still another object is to provide a fiber-binder composition in which the binder in a plastic state has sufficient wet cohesion strength and sufficient plasticity as to permit of shaping by extrusion to precise dimensions.

Another object is to provide a fiber-binder composition in which the binder, after removal of solvent, possesses sufficient dry adhesion strength and stability to retain flexibility and toughness throughout operating temperature ranges between —70° F. and 350° F.

A further object is to provide a method whereby a flame-proof and oil-proof tubular insulating shape of strong, tough and flexible structure and substantially uniform air-impervious texture can be produced in an economical and efficient manner.

To provide a flexible tubular insulating element of the requisite temperature stability and insulating properties for suitably protecting radial airplane engine parts of the type specified during cold weather operation, it has been found that the principal constituent of the insulation should be mineral fibers such as asbestos or rock wool, or mixtures thereof. The mineral fibers should comprise at least 60% by weight of the finished product, and the balance of the product must accordingly comprise a heat and oil resistant binder capable of developing an adherent and flexible, substantially non-shrinking physical bond coating and uniting the fibers into a strong, resilient and uniformly textured shape. It is also essential that the bonding agent have high wet and dry adhesive strength and good temperature stability to retain its flexibility and strength over a comparatively wide operating temperature range.

An important feature of the present invention is, therefore, to effect uniform admixture and distribution of mineral reinforcing fibers and flexible adhesive organic binder, and to develop a suitably strong and tenacious bond between these materials.

A still further object of the invention is to develop a bonding medium having a high degree of adhesiveness for mineral fibers, both in the cured product and in the uncured plastic composition from which the cured tubular product is produced by extrusion and drying.

With the above and other objects and features in view, the invention consists in the improved fiber-binder insulating composition and method of manufacture which is hereinafter described and more particularly defined in the appended claims.

In the following description, reference will be made to the accompanying drawing as presenting an illustrative example of a tubular fiber-binder insulating shape and of the method employed in its manufacture.

In the drawing: Fig. 1 presents in diagrammatic flow sheet form the principal steps involved in producing fiber-binder insulating shapes in accordance with the present invention; Fig. 2 is a perspective view of a longitudinally slit extruded and cured tubular insulating shape comprising the fiber-binder composition of the present invention and particularly adapted for use for insulating radial airplane engine push rod housings; Fig. 3 is a perspective view of the shape of Fig. 2 opened into a substantially flat sheet preparatory to its application as an insulating covering for a pipe or the like; and Fig. 4 is a view in cross-section illustrating a modified form of pin and nozzle die adapted for extruding ells or similar curved tubular shapes.

A binder suitable for use in the proportions indicated to impart desirable properties of high strength, toughness, flexibility, oil and water resistance, air impermeability, and non-flammability, can best be produced from synthetic resins or plastics of the polyvinyl type, including particularly such rubberlike plastics as poly-chloro-prene, butadiene-acrylonitrile and butadiene-styrene copolymers, and copolymers of vinyl-chloride with vinyl-acetate or vinylidene chloride. It is desirable that such rubber-like plastics be highly plasticized, preferably with flame-proofing plasticizers of the type of chlorinated diphenyl or tricresyl phosphate. To impart to the binder the degrees of plasticity, wet strength and cohesion which are necessary for producing a plastic fiber-binder composition of the indicated fiber content suitable for extrusion to tubular shapes of precise dimensions, it has been found that the resin component of the binder must be milled to the consistency of a fluid cement in the presence of a solvent capable of forming with the polyvinyl or resin plastic a colloidal adhesive gel. An example of such a solvent which has been successfully used for reducing to fluid consistency a fast curing poly-chloroprene plastic of the type of "Neoprene G. N." is a modified petroleum solvent sold under the trade name of "Solvesso #1."

The following formula is one which has been found suitable for preparing tubular insulation shapes in accordance with the present invention:

| Ingredient | Parts by weight |
|---|---|
| | Per cent |
| Poly-chloroprene (Neoprene G. N.) | 13.9 |
| Light-calcined magnesia | .6 |
| Zinc oxide | .7 |
| Phenyl beta naphthylamine anti-oxidant | .6 |
| Light petroleum solvent (Solvesso #1) | 27.8 |
| Chloro-diphenyl plasticizer (Arochlor 1262) | 4.2 |
| Mineral wool | 39.1 |
| Asbestos fiber (Amosite) | 13.1 |

The composition may be prepared in a plastic form suitable for shaping by extrusion, by first forming a highly adhesive cement. The poly-chloroprene is first mixed with the magnesia and the zinc oxide and the anti-oxidant by thorough milling, as on a suitable rubber mill 10. The dry mixture thus produced is then placed in an agitator mixer 12 such as a Ross mixer, the petroleum hydrocarbon solvent is added thereto, and the cement thus formed is reduced to a highly plastic cement of fluid consistency by agitation mixing over a period of several hours. (For example, 8–10 hours.) The polychloroprene cement resulting from this mixing operation is then introduced to a "dough" or "kneading" type of mixer 14 and the plasticizer is added and thoroughly kneaded into the cement over a period sufficient to insure a uniform plastic product.

In the meantime, the asbestos fiber is subjected to a fiberizing or separating operation, as by passing through a conventional asbestos fiberizing unit, and the fiberized asbestos is then thoroughly mixed with the mineral wool, as by passing through a willowing unit 16. The thus willowed asbestos and mineral wool (i. e. rock wool) are then gradually added to and mixed with the plasticized poly-chloroprene cement; the mixing and agitating operation being continued in mixer 14 until the fiber-binder mixture has a uniform texture which is sufficiently plastic and putty-like for extrusion molding. This mixing operation normally consumes about 1 hour and should not be continued after a suitable plastic state is reached, because excessive mixing has an adverse effect on the wet to dry shrinkage of the extruded product, due to breaking up of the fibers and consequent loss of resilience of the product.

The next step in producing the extruded tubular shapes is to force the uniformly textured and plastic fiber-binder mixture under pressure through a pin and nozzle extrusion die 18 dimensioned to the precise cross-sectional dimensions of the desired tubular product. For extruding shapes of 1" inside diameter, 1⅜" outside diameter and 7"–9" lengths, the necessary extrusion pressure may be developed by a force of approximately 1500 lbs. per square inch applied to the plastic extrusion mixture through a 10" piston. From the extrusion die the shapes are discharged at 20 to atmosphere, where they can be immediately cut to suitable length and then dried in an oven 22 at temperatures not exceeding 300° F.

In order that the resulting tubular insulating shape 24 may be easily fitted over short sectioned oil pipes or other tubular engine parts, it has been found advantageous to slit it longitudinally as at 26 (Fig. 2). When properly made in accordance with the present invention, the tubes can be opened at the longitudinal slit 26 sufficiently for slipping over a pipe or rod as an insulating shield, without developing cracks at that portion 28 of the element (diametrically opposite the slit) which functions as a hinge during the opening operation. The tubes should have sufficient flexibility and resilience so that they can be opened at the longitudinal slit to the form of a flat sheet without cracking (Fig. 3) and then snap back to their original tubular shape. Also the heat-cured tubes should have sufficient temperature stability so that they will remain strong and flexible over a temperature range between 350° F. and —70° F. The density of a tube thus made, having sufficient air impermeability to hold convection heat losses within a practical minimum, should lie between 60–70 lbs. per cubic foot. The composition of the tubular shapes is such that they can be readily slit longitudinally by a knife, by saw or by a piano wire. Also, in cases where it is necessary to cut out portions 30 of the tube to accommodate irregular fittings, such operation can be effected by grinding with a reasonably coarse grinding wheel.

A test strip made from a composition corresponding to the aforementioned formula and molded and cured in the manner described, exhibited a tensile strength of 706 lbs. per square inch, with an elongation before failure of .05 inch per inch of length. Such strip had a minimum cross-sectional dimension of 1" x ¼". A sheet of the same composition exhibited a compression strength and resilience such as to snap back to 100% original dimension after being compressed to approximately half its original thickness under a load approximating 2500 lbs. per square inch. A strip of the same composition of approximately ⅓ inch thickness, 1½ inch width, and 11 inch length, when subjected to twisting between grips spaced 9 inches apart, exhibited a torsional strength equivalent to an angular deflection of 320° before failure under a load of 25¾ lbs. The modulus of rigidity of this sheet was therefore 2560.

The fiber content of the cured tubular shape should normally range between 65%–75% by weight, and consists preferably of 2 to 3 parts mineral wool (i. e. rock wool) and about 1 part asbestos fiber. A product of even higher tensile strength has been made in accordance with the following extrudable plastic formula:

| Ingredient | Parts by weight |
|---|---|
| | Per cent |
| Mineral wool | 35 |
| Amosite asbestos fibers | 17½ |
| Methyl ethyl ketone | 14 |
| Petroleum solvent (Solvesso #1) | 15 |
| Polyvinyl chloride-acetate co-polymer (98% vinyl chloride) | 12 |
| Tricresyl phosphate plasticizer | 7 |

Extruded insulating tubes which have been made in accordance with the process and formulas herein described have tensile strengths greater than 600 lbs. per square inch, and have such high flexibility as to permit of flattening out a tube of 1" diameter without cracking, and such high resilience as to allow a tube so flattened out to snap back to its original shape. The cured mixture making up the tube walls weighs 60-70 lbs. per cubic ft. and has a thermal conductivity factor of .9-1 B. t. u./(hr.) (sq. ft.) (°F. per inch).

The cured shapes are chemically and dimensionally stable, and are particularly adapted for insulating oil pipes and engine parts which are exposed to wide ranges of temperature both below and above freezing temperature. The high flexibility and toughness of the cured shapes result largely from the high proportion of mineral wool fibers in the composition, and from the presence of exceptionally high proportions of plasticizers of the type of tricresyl phosphate and chlorodiphenyl employed with a polyvinyl resin binder.

While the products resulting from the extrusion and drying of the plastic composition herein referred to have a texture which is substantially uniform throughout, with the fibers uniformly distributed within the product, it has been noted that the fibers are in general longitudinal arrangement or lay, so that the resulting shapes have substantial uniformly of strength and toughness, but maximum tear resistance in a direction transverse to the lay of the fibers. This alignment of the fibers in a direction generally parallel to the longitudinal axis of the tube takes place during the high pressure extrusion operation. Primarily as a result of this tendency of the fibers to align themselves in the direction of extrusion, it has been found possible to form curved shapes such as tubular elbows 32, by continuous extrusion through a pin and nozzle die in which a bore-forming pin 34 is supported by a spider 36 with its major axis intersecting the longitudinal axis of the die nozzle at a small acute angle (Fig. 4). In other words, the rearward end of pin 34 adjacent the discharge end of the nozzle is slightly offset, for example $\frac{1}{32}''$, with respect to the major axis of the nozzle, while the forward end of the pin coincides with the nozzle axis. A curvature can thus be imparted to the extruded shape without unduly weakening its structure as a result of developing some non-uniformity of wall thickness.

For some purposes the extruded insulating shapes herein described may be formed of less resilient oil and heat proof compositions, and in certain cases at least part of the asbestos or mineral wool content may be replaced with vegetable fibers such as cotton or flax. However, the important features of the present invention chiefly depend on the use of a mixture of mineral fibers and polyvinyl type resin binder in which the fiber content is comparatively large (i. e. 65%-75% by weight), and in which the resulting cured product possesses good insulating properties, and also a high degree of air impermeability, flexibility, tensile strength and stability over a comparatively wide temperature range.

In characterizing the uncured or plastic fiber composition of the present invention as having high wet adhesive strength or cohesion, such terms are used in their normal sense to define a composition which, when shaped to any particular form by an extrusion molding operation, retains such form and dimensions during subsequent drying and vaporization of solvent, unless distorted by application of distorting forces. It is this property of the plastic composition which makes it possible to extrude to precise dimensions tubular shapes of varying wall thickness, density and porosity. The plasticity and wet adhesion strength of the binder components are such that long and harsh reinforcing fibers of the type of mineral wool and amosite asbestos may advantageously be employed in the composition without serious adverse effect on the homogeneous texture and ready extrudability of the plastic composition. The presence of such high proportions of long and harsh mineral fibers imparts to the dried and cured product a high degree of toughness and flexibility along with low density and high tensile and compression strength.

Since many variations may be made from the illustrative details given, without departing from the scope of the invention, it is intended that the invention should be limited only by the terms of the claims interpreted as broadly as consistent with novelty over the prior art.

What we claim is:

1. A process for manufacturing plastic insulation suitable for extrusion molding which comprises, thoroughly mixing a binder comprising about 1 part by weight of rubbery polyvinyl resin with approximately ¼-½ part of a flameproofing plasticizer and with a solvent for said resin to produce a fluid cement comprising a colloidal gel-like suspension, admixing with the cement approximately 4 parts of mineral wool and amosite asbestos fibers in the proportions of about 2-3:1 by weight and working up the mixture to effect uniform coating of the fibers and distribution of the fibers throughout the mixture, and agitating the mixture to impart a plastic, putty-like consistency thereto.

2. A uniformly textured heat insulation composition of plastic, putty-like consistency suitable for extrusion molding comprising, about 50% by weight of mineral wool and amosite asbestos fibers in the proportions of about 2-3:1, and about 50% of a highly plasticized polyvinyl resin cement containing about 5 parts solids and 8 parts solvent adapted to produce with the plasticized resin a fluid cement comprising a colloidal gel-like suspension, the solids portion of the resin cement comprising chiefly a rubbery polyvinyl resin and a flameproofing plasticizer in the proportions of approximate 2-4:1.

GEORGE P. LEISTENSNIDER.
HARRY H. RINEHART.